(12) United States Patent
Kosaka et al.

(10) Patent No.: US 9,014,050 B2
(45) Date of Patent: Apr. 21, 2015

(54) INFORMATION PROCESSING APPARATUS, INFORMATION PROCESSING METHOD, AND INFORMATION PROCESSING SYSTEM

(71) Applicant: Sony Corporation, Tokyo (JP)

(72) Inventors: Yoshihiro Kosaka, Kanagawa (JP); Hiroaki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 114 days.

(21) Appl. No.: 13/739,774

(22) Filed: Jan. 11, 2013

(65) Prior Publication Data

US 2013/0188517 A1   Jul. 25, 2013

(30) Foreign Application Priority Data

Jan. 19, 2012   (JP) ................. 2012-009034

(51) Int. Cl.
  *H04L 12/28*   (2006.01)
  *H04L 12/24*   (2006.01)
  *H04L 12/26*   (2006.01)

(52) U.S. Cl.
  CPC ............ *H04L 41/08* (2013.01); *H04L 43/0835* (2013.01); *H04L 43/0852* (2013.01); *H04L 43/087* (2013.01); *H04L 43/0882* (2013.01)

(58) Field of Classification Search
  USPC .............. 370/254, 328–350, 503–510; 348/207.99–207.11, 211.99–211.3, 348/211.9
  See application file for complete search history.

(56) References Cited

U.S. PATENT DOCUMENTS

| 5,347,511 A * | 9/1994 | Gun .......................... 370/255 |
| 6,046,981 A * | 4/2000 | Ramamurthy et al. ....... 370/232 |
| 7,260,060 B1 * | 8/2007 | Abaye et al. ................. 370/230 |
| 2012/0062755 A1 * | 3/2012 | Takahashi et al. ....... 348/211.11 |
| 2012/0098980 A1 * | 4/2012 | Takahashi et al. ....... 348/207.11 |

FOREIGN PATENT DOCUMENTS

| JP | 9-238277 | 9/1997 |
| JP | 2004-304809 | 10/2004 |
| JP | 2011-217061 | 10/2011 |
| JP | 2011-217062 | 10/2011 |

* cited by examiner

*Primary Examiner* — Frank Duong
(74) *Attorney, Agent, or Firm* — Hazuki International, LLC

(57) ABSTRACT

There is provided an information processing apparatus including a communication controller for determining, based on an influence of a second communication device on a communication network connected to one or more first communication devices, whether joining of the second communication device in the communication network is accepted.

17 Claims, 9 Drawing Sheets

INFORMATION PROCESSING APPARATUS, INFORMATION PROCESSING METHOD, AND INFORMATION PROCESSING SYSTEM

BACKGROUND

The present disclosure relates to an information processing apparatus, an information processing method, and an information processing system.

As disclosed in Japanese Patent Application Laid-Open Publication Nos. H9-238277, 2004-304809, 2011-217061, and 2011-217062, a camera system used in a television station or the like has been known. Such a camera system includes a plurality of CHUs (Camera Head Units) and a receiving device configured to communicate with these CHUs.

SUMMARY

However, none of Japanese Patent Application Laid-Open Publication Nos. H9-238277, 2004-304809, 2011-217061, and 2011-217062 teach how to process information when the number of CHUs constituting a camera system is increased or decreased. It is, therefore, desirable to provide techniques capable of appropriately performing information processing even when the number of communication devices constituting an information processing system is increased or decreased.

According to an embodiment of the present disclosure, there is provided an information processing apparatus including a communication controller for determining, based on an influence of a second communication device on a communication network connected to one or more first communication devices, whether joining of the second communication device in the communication network is accepted.

According to an embodiment of the present disclosure, there is provided an information processing apparatus including a communication controller for causing a delay amount of communication performed by one or more first communication devices via a communication network to be identical to a system delay amount, and when a second communication device joins in the communication network, causing the system delay amount to be identical to an additional delay amount, the additional delay amount being a delay amount of communication performed by the second communication device via the communication network.

According to an embodiment of the present disclosure, there is provided an information processing apparatus including a communication controller for causing a delay amount of communication performed by a plurality of first communication devices via a communication network to be identical to a system delay amount, and when one of the plurality of first devices is disconnected from the communication network, readjusting the system delay amount.

According to an embodiment of the present disclosure, there is provided an information processing method including determining, based on an influence of a second communication device on a communication network connected to one or more first communication devices, whether joining of the second communication device in the communication network is accepted.

According to an embodiment of the present disclosure, there is provided an information processing method including causing a delay amount of communication performed by one or more first communication devices via a communication network to be identical to a system delay amount, and when a second communication device joins in the communication network, causing the system delay amount to be identical to an additional delay amount, the additional delay amount being a delay amount of communication performed by the second communication device via the communication network.

According to an embodiment of the present disclosure, there is provided an information processing method including causing a delay amount of communication performed by first communication devices via a communication network to be identical to a system delay amount, and when a given first communication device of the first communication devices is disconnected from the communication network, adjusting the system delay amount.

According to an embodiment of the present disclosure, there is provided an information processing system including one or more first communication devices and an information processing apparatus including a communication controller for determining, based on an influence of a second communication device on a communication network connected to the one or more first communication devices, whether joining of the second communication device in the communication network is accepted.

According to an embodiment of the present disclosure, there is provided an information processing system including one or more first communication devices and an information processing apparatus including a communication controller for causing a delay amount of communication performed by the one or more first communication devices via a communication network to be identical to a system delay amount, and when a second communication device joins in the communication network, causing the system delay amount to be identical to an additional delay amount, the additional delay amount being a delay amount of communication performed by the second communication device via the communication network.

According to an embodiment of the present disclosure, there is provided an information processing system including a plurality of first communication devices and an information processing apparatus including a communication controller for causing a delay amount of communication performed by the plurality of first communication devices via a communication network to be identical to a system delay amount, and when any of the plurality of first communication devices are disconnected from the communication network, readjusting the system delay amount.

According to the embodiments of the present disclosure, the information processing apparatus can appropriately determine whether the joining of a second communication device in the communication network is accepted. Further, according to the embodiments of the present disclosure, it is possible to appropriately determine whether the system delay amount is to be identical to the additional delay amount. Moreover, according to the embodiments of the present disclosure, it is possible to maintain the system delay amount at an appropriate value when the first communication device is disconnected from the communication network.

As described above, according to the embodiments of the present disclosure, it is possible to perform appropriately the information processing even when the number of communication devices constituting an information processing system is increased or decreased.

DETAILED DESCRIPTION OF THE EMBODIMENT(S)

Figure 1:
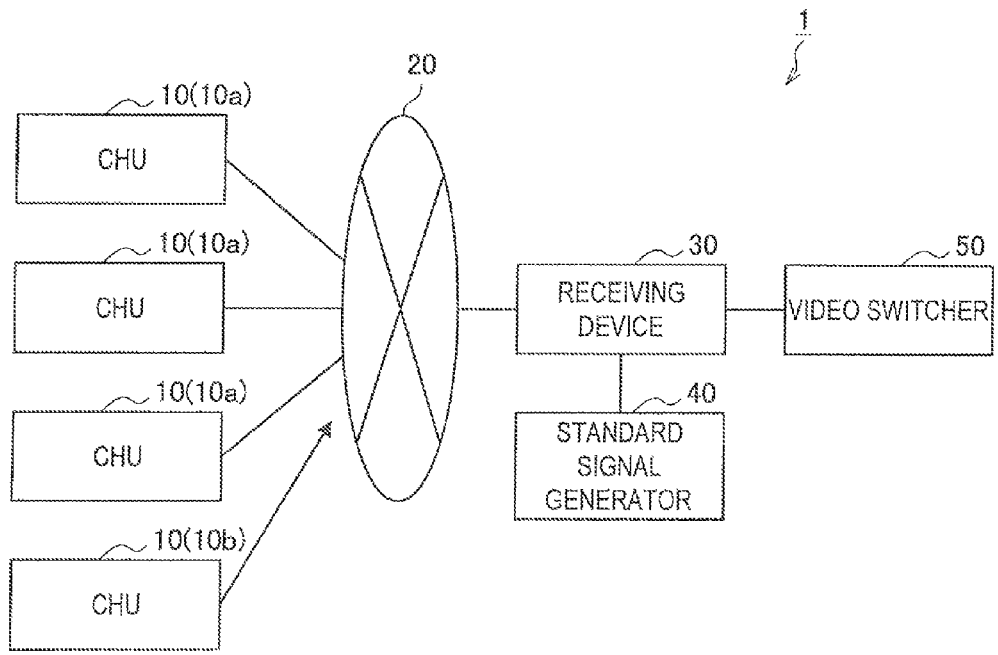
FIG. 1 is a block diagram illustrating a configuration of an information processing system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. First Embodiment
1-1. Discussion of Background Art
1-2. General Configuration of Information Processing System
1-3. Configuration of CHU
1-4. Configuration of Receiving Device
1-5. Process Performed by Information Processing System
1-6. Modification
2. Second Embodiment
2-1. Process Performed by Information Processing System
3. Third Embodiment
3-1. Process Performed by Information Processing System
4. Another Exemplary Configuration of Information Processing System

1. First Embodiment

[1-1. Discussion of Background Art]

An information processing system according to the embodiments of the present disclosure has been made in view of the background art related to the embodiments. Thus, the background art of the embodiments will be discussed first. As disclosed in the above-mentioned Japanese Patent Application Laid-Open Publication Nos. H9-238277, 2004-304809, 2011-217061, and 2011-217062, for example, a camera system used in a television station or the like has been known. This camera system includes a plurality of CHUs (Camera Head Units), at least one receiving device configured to communicate with the a standard signal generator, and a video switcher. The receiving device may be referred to as a CCU (Camera Control Unit) when communicating with a single CHU, while the receiving device may be referred to as a MCCU (Multi Camera Control Unit) when simultaneously communicating with a plurality of CHUs.

The receiving device transmits standard information outputted from a standard signal generator at a predetermined period to each CHU. Each CHU transmits image information synchronized with the standard information to the receiving device. The receiving device transmits the image information provided from each CHU to a video switcher. However, a timing at which image information provided from each CHU arrives at the video switcher may be varied for each CHU due to the transmission delay in a camera cable for connecting each CHU with the receiving device, a processing delay in the receiving device, and so on. In particular, when each CHU and the receiving device are connected via an asynchronous transmission network, such a variation is significantly increased. This is because communication paths between each CHU and the receiving device are likely to be optionally changed or components constituting the asynchronous transmission network may be replaced.

Therefore, the process to reduce this variation is performed in the camera system. As examples of such a process, there have been proposed a process for advancing a timing (a frame timing) at which the generation of image information is initiated at the CHU side by as much as the delayed amount, and a process for absorbing the delayed amount at a buffer in the receiving device side. However, only one period of standard information is permissible at the advanced maximum timing. Thus, when the delay caused by each CHU exceeds one period (one field) of standard information, the delayed amount is absorbed by a buffer of the receiving device.

In addition, Japanese Patent Application Laid-Open Publication Nos. 2011-217061, and 2011-217062 disclose techniques for causing a communication delay amount of each CHU to be identical to system delay amount when power is turned on or a resetting of system is performed. However, none of Japanese Patent Application Laid-Open Publication. Nos. H9-238277, 2004-304809, 2011-217061, and 2011-217062 teach how to perform the information processing when the number of CHUs constituting the camera system is increased or decreased. On the other hand, the information processing system according to the embodiments of the present disclosure can appropriately perform the information processing when the number of CHUs constituting the information processing system is increased or decreased. Roughly speaking, the information processing system can adjust the communication delay amount of each CHU to an appropriate value when the number of CHU is increased or decreased.

[1-2. General Configuration of Information Processing System]

A general configuration of an information processing system 1 according to the first embodiment will be described with reference to FIG. 1. The information processing system 1 is a so-called camera system and includes a plurality of CHUs 10*a* (first communication devices), a communication network 20, a receiving device (an information processing apparatus) 30, a standard signal generator 40, and a video switcher 50.

The CHUs 10*a* generate image information by capturing the surroundings thereof, and generate encoded image information by encoding the generated image information. The CHUs is 10*a* are connected to the communication network 20, and transmit the encoded image information to the receiving device 30 via the communication network 20. Thus, the CHUs 10*a* perform a communication via the communication network 20.

The communication network 20 is a so-called asynchronous transmission network, and is configured to include a communication cable, relay (a switching hub etc.) or the like.

For this reason, a communication path from each CHU 10*a* to the receiving device 30 may be optionally varied. When the communication path is varied, the time taken for the encoded image information to arrive at the receiving device 30 after the encoded image information is transmitted from each CHU 10*a*, that is, transmission delay amount is also varied. In addition, the transmission delay amount is also varied due to a change or alteration in components constituting the communication network 20.

Further, delay amount in the communication performed by the CHUs 10*a* (and CHU 10*b* to be described later), that is, a communication delay amount is a time from when the CHUs 10*a* generate image information to when the receiving device 30 outputs the image information to the video switcher 50. Thus, the communication delay amount of the CHUs 10*a* includes other time in addition to the transmission delay amount. Specifically, the communication delay amount of the CHUs 10*a* includes an encoding time, a decoding time, and a waiting time, in addition to the transmission delay amount. The encoding time is a time taken for the CHUs 10*a* to encode image information. The decoding time is a time taken for the receiving device 30 to decode the encoded image information. The waiting time is a total value of times taken for buffers 33, 35 (see FIG. 3) of the receiving device 30 to be wait. Note that these times are specified values.

Thus, the receiving device 30 computes the statistics of the transmission delay amount of each CHU 10*a* to calculate a statistical delay amount Tb. The receiving device 30 then adds an encoding time, a decoding time and a waiting time to the statistical delay amount Tb, thereby calculating system delay amount. The receiving device 30 causes the communication delay amount of each CHU 10*a* to be identical to the system delay amount by advancing a frame timing of the CHU 10*a* (a timing for initiating the generation of image information) by as much as the system delay amount.

More specifically, the receiving device 30 sets a current time as a reference time when it receives standard information from the standard signal generator 40. The receiving device 30 then subtracts the system delay amount from the reference time. Because a value obtained from the subtraction indicates the past time, even when this past time is notified to the CHU 10*a* without change, the CHU 10*a* may not correspond to it. Thus, the receiving device 30 calculates a synchronization time by adding a period T of standard information to the value obtained from the subtraction of the system delay amount from the reference time. This synchronization time is earlier than the time at which the standard signal generator 40 outputs standard information of the next frame by as much as the system delay amount. The receiving device 30 then notifies each CHU 10*a* of the synchronization time.

Each CHU 10*a* generates image information at the synchronization time notified from the receiving device 30, and transmits encoded image information to the receiving device 30. In other words, the time when each CHU 10*a* generates image information is advanced by as much as the system delay amount. As a result, at a time at least when the standard signal generator 40 outputs standard information of the next frame to the receiving device 30, image information provided from each CHU 10*a* will be stored in the buffer 35 of the receiving device 30.

Further, when the receiving device 30 receives a request of a new CHU 10, i.e. CHU 10*b* (a second communication apparatus) to join in the communication network 20, the receiving device 30 determines whether the joining of the CHU 10*b* in the communication network 20 is accepted, based on the influence of the CHU 10*b* on the communication network 20. Furthermore, the receiving device 30, when the joining of the CHU 10*b* is accepted, adjusts the communication delay amount of the CHU 10*b*, i.e. the additional delay amount based on the system delay amount. The CHU 10*a* and CHU 10*b* may be collectively referred to as a "CHU 10" hereinafter.

The standard signal generator 40 outputs the standard information to the receiving device 30. This standard information is intended to be a reference of the timing at which each CHU 10 generates image information. The video switcher 50 outputs desired image information of the image information provided from the receiving device 30 to an external apparatus, for example, any display or the like.

[1-3. Configuration of CHU]

Figure 2:
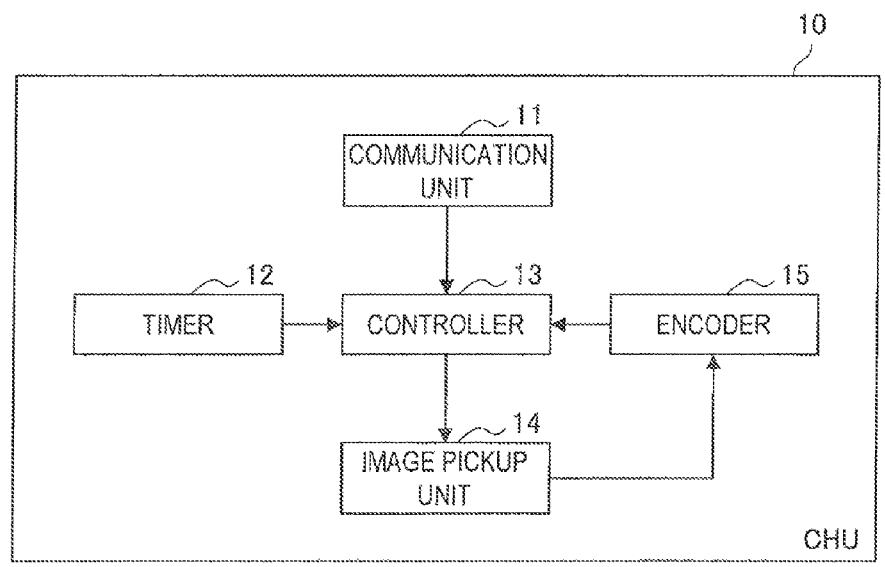
FIG. 2 is a block diagram illustrating a configuration of a camera head unit (CHU)

Next, referring to FIG. 2, the configuration of CHU 10 will be described. The CHU 10 includes a communication unit 11, a timer 12, a controller 13, an image pickup unit 14, and an encoder 15. The CHU 10 includes hardware configurations such as a CPU, a ROM, a RAM (buffer), a flash memory, a communication device, a lens unit, an image sensor, and a PLL. These hardware configurations make it possible to implement the above-mentioned individual functional blocks. In other words, the ROM stores a program for causing the CHU 10 to implement the communication unit 11, the timer 12, the controller 13, the image pickup unit 14, and the encoder 15. The CPU reads and executes the program.

The communication unit 11 receives synchronization information relating to the synchronization time from the receiving device 30, and outputs the synchronization information to the controller 13. In addition, the communication unit 11 transmits information provided from the controller 13 to the receiving device 30. The timer 12 outputs current time information to the controller 13.

The controller 13 obtains the current time information from the timer 12. When a time indicative of the current time information is coincident with the synchronization time, the controller 13 outputs the synchronization information to the image pickup unit 14. The controller 13, when it receives the encoded image information from the encoder 15, obtains the current time information from the timer 12, and then sets the current time information as time stamp information to assign it to the encoded image information. The controller 13 outputs the encoded image information assigned with the time stamp information to the communication unit 11.

In addition, the controller 3, when there is a request to join in the communication network 20, outputs JOIN notification information that indicates the request to the communication unit 11. The controller 13 performs a synchronization establishment process for establishing synchronization (more specifically, clock synchronization) with the receiving device 30. The controller 13, when the synchronization with the receiving device 30 is established, outputs synchronization completion notification information relevant to the processing capability (e.g., transmission rate (throughput), encoding time, or the like) of the CHU 10 to the communication unit 11.

The image pickup unit 14 performs a pickup process when it receives the synchronization information. Thus, the image pickup unit 14 generates image information and outputs it to the encoder 15. The encoder 15 encodes the image information to generate encoded image information, and outputs it to the controller 13.

[1-4. Configuration of Receiving Device]

Figure 3:
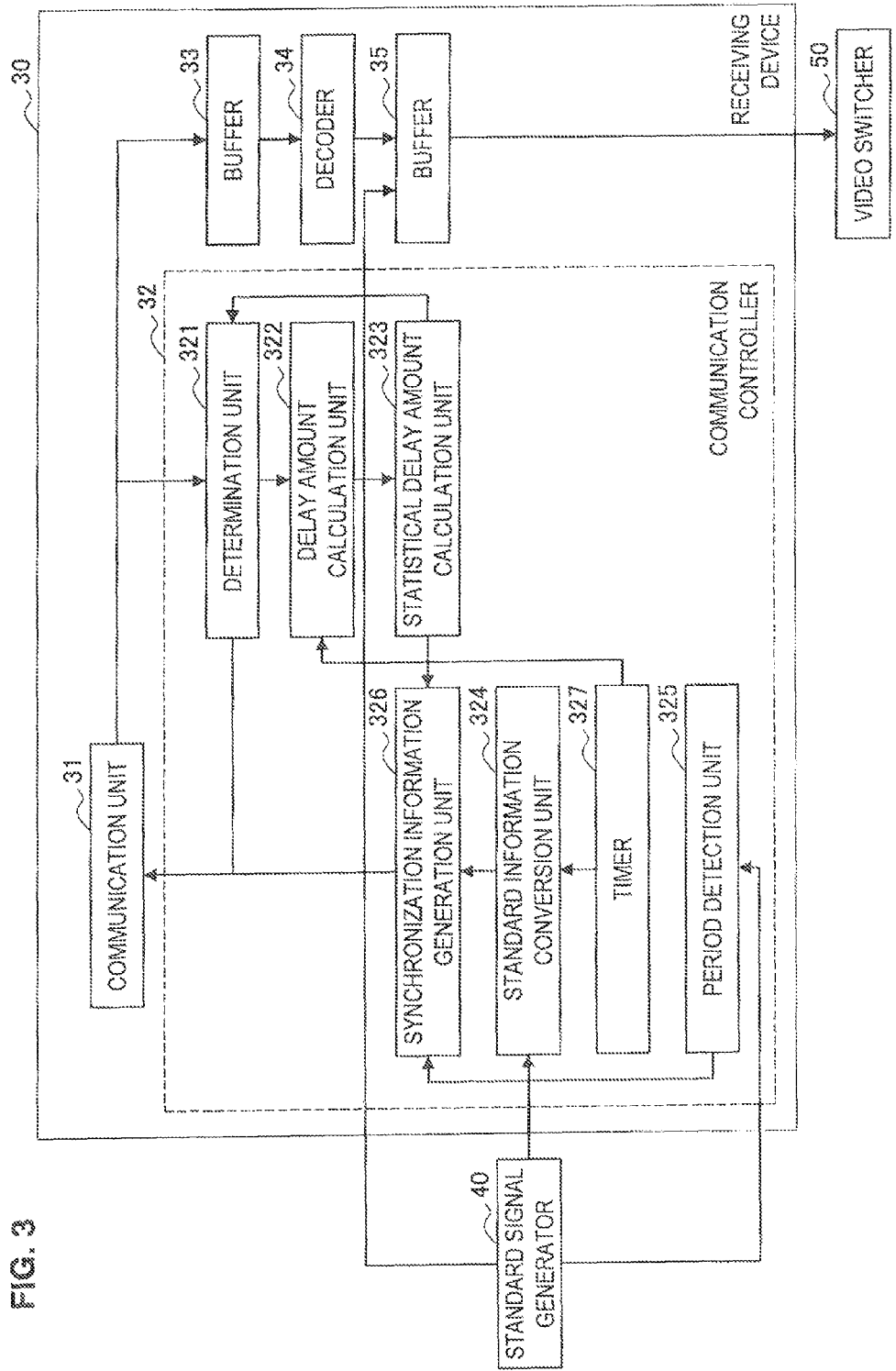
FIG. 3 is a block diagram illustrating a configuration of a receiving device.

Subsequently, referring to FIG. 3, the configuration of the receiving device 30 will be described. The receiving device 30 includes a communication unit 31, a communication controller 32, a buffer 33, a decoder 34, and a buffer 35. The receiving device 30 includes hardware configurations such as a CPU, a ROM, a RAM (buffer), and a communication device. These hardware configurations make it possible to implement the above-mentioned individual functional blocks. In other words, the ROM stores a program for causing the receiving device 30 to implement the communication unit 31, the communication controller 32, the buffer 33, the decoder 34, and the buffer 35. The CPU reads and executes the program. In addition, the ROM has stored thereon information necessary for a process performed by the receiving device 30, such as an encoding time of each CHU 10a, a waiting time of the buffers 33, 35, a decoding time of the decoder 34, a transmission rate (throughput) of each CHU 10a, bandwidth of the communication network 20, and so on.

The communication unit 31 outputs the encoded image information transmitted from the CHU 10 to the communication controller 32 and the buffer 33. The communication unit 31 transmits information provided from the communication controller 32 to the CHU 10.

The communication controller 32 includes a determination unit 321, a delay amount calculation unit 322, a statistical delay amount calculation unit 323, a standard information conversion unit 324, a period detection unit 325, a synchronization information generation unit 326, and a timer 327.

The determination unit 321, when receiving the encoded image information, outputs time stamp information contained in the encoded image information to the delay amount calculation unit 322. The determination unit 321 outputs synchronization process notification information to the communication unit 31 when receiving JOIN notification information. The synchronization process notification information indicates a request for establishing synchronization with the receiving device 30. The communication unit 31 transmits the synchronization process notification information to the CHU 10b.

The determination unit 321, when it receives synchronization completion notification information, determines whether the joining of the CHU 10b in the communication network 20 is accepted based on the influence of the CHU 10b on the communication network 20.

Specifically, the determination unit 321 determines whether the joining of the CHU 10b in the communication network 20 is accepted based on the state of communication performed by the CHU 10b via the communication network 20.

More specifically, the determination unit 321 calculates a total transmission rate by adding up the transmission rate of all of the CHU 10a and the transmission rate of the CHU 10b. Further, the determination unit 321 calculates a use rate of a network bandwidth based on a network bandwidth of the communication network 20 and the total transmission rate. The determination unit 321 sets a threshold Tr based on QoS (Quality of Service) necessary for the information processing system 1. As the QoS is higher, the threshold Tr is set to be smaller. This is because the quality of communication is more likely to be decreased as the use rate of the network bandwidth is higher. The determination unit 321 determines whether the use rate of the network (i.e. total transmission rate) exceeds the threshold Tr. When it is determined that the use rate of the network is less than or equal to the threshold Tr, the determination unit 321 determines whether a statistical delay amount Tb' of the CHUs 10a and 10b is less than a predetermined threshold value. If it is determined that the statistical delay amount is less than the predetermined threshold value, then the determination unit 321 accepts the joining of the CHU 10b in the communication network 20.

In this way, the determination unit 321 determines whether the joining of the CHU 10b in the communication network 20 is accepted, based on the network bandwidth of the communication network 20, total transmission rate, and transmission delay amount. However, the determination unit 321 may determine whether the joining is accepted based on other factors. For example, the determination unit 321 may determine whether the joining of the CHU 10b in the communication network 20 is accepted based on at least one of a jitter, a packet loss rate, congestion, a packet reordering frequency, or a packet duplication frequency of the CHU 10b.

Specifically, the determination unit 321 receives several frames of the encoded image information from the CHU 10b and detects a jitter occurred in these encoded image information. When the jitter is less than a predetermined threshold, the determination unit 321 may accept the joining of the CHU 10b in the communication network 20.

In addition, the determination unit 321 receives several frames of the encoded image information from the CHU 10b and calculates a packet loss rate of the encoded image information based on these encoded image information. When the packet loss rate is less than a predetermined threshold, the determination unit 321 may accept the joining of the CHU 10b in the communication network 20.

Further, the determination unit 321 monitors relays in the communication network 20 to detect a congestion event occurred with respect to the encoded image information provided from the CHU 10b. When the extent of congestion, more specifically, the total number of packets discarded from each relay within a predetermined period of time is less than a predetermined threshold, the determination unit 321 may accept the joining of the CHU 10b in the communication network 20.

Moreover, the determination unit 321 receives several frames of the encoded image information from the CHU 10b to detect a packet reordering (change in the packet order occurred in these encoded image information. When the number of reordering times (frequency) is less than a predetermined threshold, the determination unit 321 may accept the joining of the CHU 10b in the communication network 20.

Furthermore, the determination unit 321 receives several frames of the encoded image information from the CHU 10b and counts the number of times packets that are duplicated in these encoded image information. When the number of the counted times (frequency) is less than a predetermined threshold, the determination unit 321 may accept the joining of the CHU 10b in the communication network 20. In addition, the determination unit 321 may determine by means of any combination of the above-mentioned factors.

The delay amount calculation unit 322, when it receives the time stamp information, obtains current time information from the timer 327. The delay amount calculation unit 322 then subtracts the time indicative of time stamp from the current time to calculate transmission delay amount. The delay amount calculation unit 322 then outputs transmission delay amount information relating to the transmission delay amount to the statistical delay amount calculation unit 323. In addition, the delay amount calculation unit 322 calculates a jitter of each CHU 10 based on the time stamp information. Then, the delay amount calculation unit 322 outputs jitter information relating to the jitter to the statistical delay amount calculation unit 323. In addition, the transmission delay amount and jitter may be an average value within a predetermined period of time.

The statistical delay amount calculation unit 323 calculates a statistical delay amount by computing the statistics of the transmission delay amount information and jitter information of each CHU 10. A method of computing the statistics is not particularly limited, but for example, the following method can be exemplified.

The statistical delay amount calculation unit 323 sets a transmission delay amount having the largest amount of the transmission delay amount of each CHU 10 as statistical transmission delay amount. Thus, the transmission delay amount of any CHU 10 will at least not be greater than the statistical transmission delay amount.

Further, the statistical delay amount calculation unit 323 calculates a statistical jitter by computing the statistics of jitter information of each HCU 10. The statistical jitter may be, for example, any one of a minimum value, maximum value, arithmetic mean value, and standard deviation of the jitter. In addition, the statistical delay amount calculation unit 323 may produce a histogram of the jitter and set a jitter having the largest frequency as the statistical jitter. The statistical delay amount calculation unit 323 calculates a value obtained by adding the statistical jitter to the statistical transmission delay amount as the statistical delay amount. The statistical delay amount calculation unit 323 outputs statistical delay amount information relating to the statistical delay amount to the determination unit 321 and the synchronization information generation unit 326.

In this way, the present embodiment calculates a statistical delay amount in consideration of the jitter as well as the transmission delay amount. This is due to the following reasons. There is a tendency that the more unstable the communication network 20 is, the higher the jitter becomes. For example, as a communication path has a large number of relays and becomes unstable, jitter has a tendency to increase. In addition, there is a tendency that the higher the throughput of the communication network 20, i.e. the use rate of the network bandwidth is, the higher the jitter becomes. Accordingly, a jitter is likely to be varied significantly, depending on the state of the communication network 20. Then, in a case where the value of jitter is large, when the statistical delay amount is obtained using only the statistical transmission delay amount without considering the jitter, any one of the transmission delay amount of the CHUs 10 may be more likely to be larger than the statistical delay amount, depending on the state of the communication network 20. In this case, although the synchronization time is advanced than the standard information time, i.e. the reference time, by as much as the system delay amount, at the time when the standard information of the next frame is outputted to the receiving device 30, there is a possibility that image information provided from some CHU 10a is not stored in the buffer 35. Therefore, in the present embodiment, the statistical delay amount is calculated in consideration of the jitter as well as the transmission delay amount.

When the standard information conversion unit 324 receives the standard information from the standard signal generator 40, the standard information conversion unit 324 obtains current time information from the timer 327. The standard information conversion unit 324 sets a time indicated by the current time information as a reference time, and generates reference time information relating to the reference time. The standard information conversion unit 324 outputs the reference time information to the synchronization information generation unit 326.

The period detection unit 325 detects a period T of standard information based on the standard information provided from the standard signal generator 40. The period detection unit 325 then outputs period information relating to the period T to the synchronization information generation unit 326.

The synchronization information generation unit 326 calculates a synchronization time based on the statistical delay amount information, reference time information, and period information. Specifically, the synchronization information generation unit 326 calculates the total value obtained by adding up the longest one of encoding time of each CHU 10, the decoding time of the decoder 34, the waiting time of the buffer 33, and the waiting time of the buffer 35. The synchronization information generation unit 326 sets the total value as a specified delay amount. The synchronization information generation unit 326 then calculates system delay amount by adding the specified delay amount to the statistical delay amount. Further, the synchronization information generation unit 326 calculates the synchronization time by subtracting the system delay amount from the reference time and by adding the period T of standard information to the result obtained from the subtraction. The synchronization information generation unit 326 outputs synchronization information relating to the synchronization time to the communication unit 31. This synchronization time is earlier than the time at which the standard signal generator 40 outputs standard information of the next frame by as much as the system delay amount. The timer 327 outputs the current time information to the delay amount calculation unit 322 and the standard information conversion unit 324.

The buffer 33 is a buffer configured to absorb a jitter and transmission delay amount of the encoded image information transmitted from the CHU 10. In other words, the buffer 33 maintains the encoded image information provided from the communication unit 31, and outputs the encoded image information to the decoder 34 at intervals of the above-mentioned period T. In this regard, a waiting time has been set in the buffer 33, and thus even the longest time of the time taken for the buffer 33 to maintain the encoded image information will not exceed the waiting time.

The decoder 34 generates image information by decoding the encoded image information and outputs the generated image information to the buffer 35. The buffer 35 is configured to absorb a jitter caused in the decoding process performed by the decoder 34. In other words, the buffer 35 maintains the image information provided from the decoder 34, and outputs the image information to the video switcher 50 at the timing at which the standard information is provided from the standard information generator 40, i.e. at intervals of the above-mentioned period T. In this regard, a waiting time has been set also in the buffer 35, and thus even the longest time of the time taken for the buffer 35 to maintain the encoded image information will not exceed the waiting time.

[1-5. Process Performed by Information Processing System]

Figure 4:
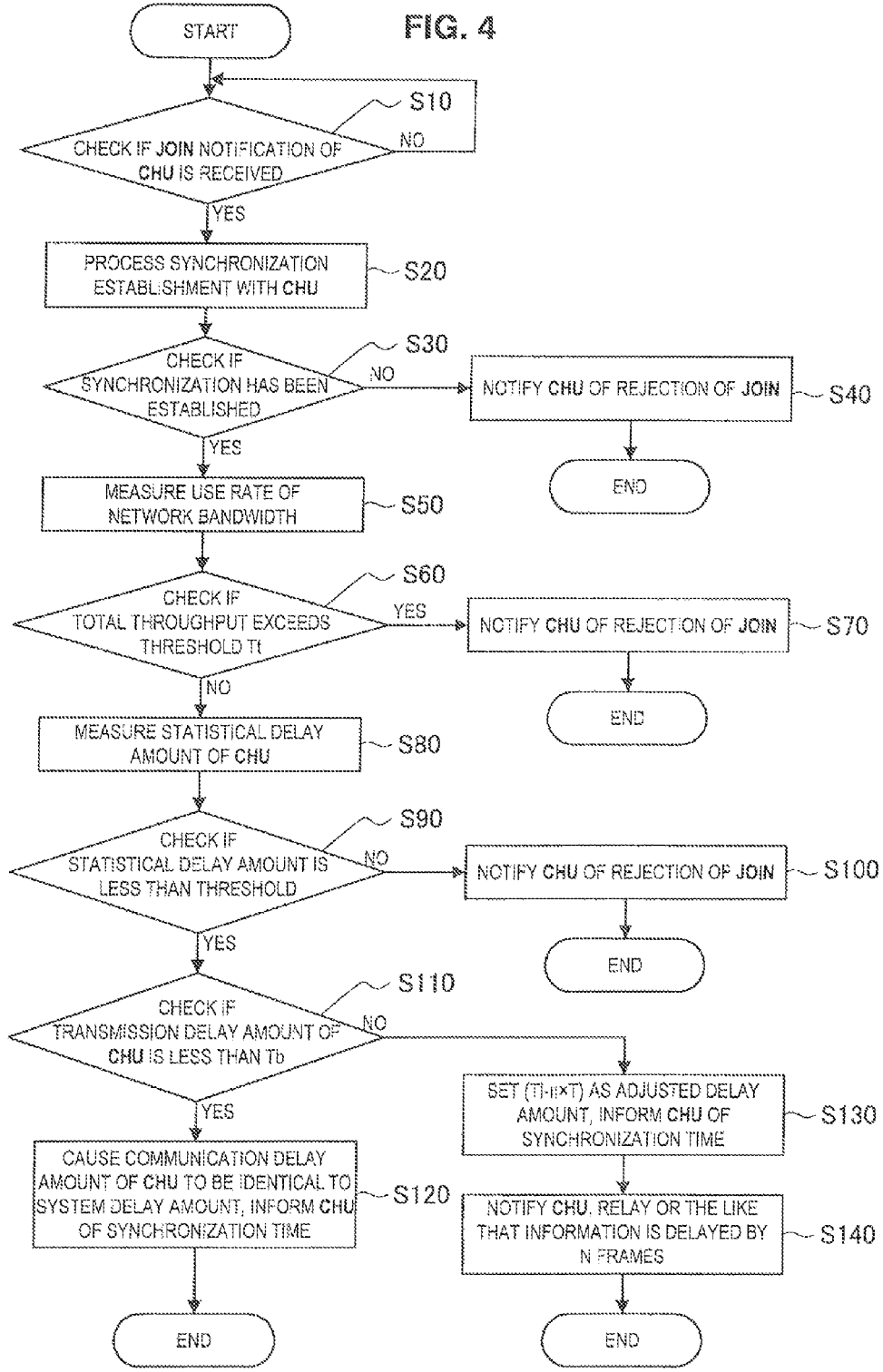
FIG. 4 is a flowchart illustrating a procedure of a process performed by the receiving device.

Next, the procedure of a process performed by the information processing system 1 will be described with reference to the flowchart shown in FIG. 4. The information processing system 1 performs a process for causing the communication delay amount of a CHU 10a, i.e. a CHU 10 which has been connected to the communication network 20 to be identical to the system delay amount, as a preprocessing.

Specifically, the standard signal generator 40 outputs the standard information to the standard information conversion unit 324 and the period detection unit 325 at intervals of the period T. The period detection unit 325 detects the period T of the standard information based on the standard information provided from the standard signal generator 40. The period detection unit 325 then outputs period information relating to the period T to the synchronization information generation unit 326.

Subsequently, the standard information conversion unit 324 obtains current information time information from the timer 327 when receiving the standard information from the standard signal generator 40. The standard information conversion unit 324 sets a time indicated by the current time information as a reference time, and generates reference time information relating to the reference time. The standard information conversion unit 324 outputs the reference time information to the synchronization information generation unit 326.

Next, the synchronization information generation unit 326 calculates a synchronization time based on the reference time information and the period information. Specifically, the synchronization information generation unit 326 calculates the synchronization time by adding the period T of the standard information to the reference time. The synchronization information generation unit 326 outputs synchronization information relating to the synchronization time to the communication unit 31.

The communication unit 11 of each CHU 10a receives the synchronization information and outputs the synchronization information to the controller 13. The controller 13 obtains current time information from the timer 12, and outputs the synchronization information to the image pickup unit 14 when a time indicated by the current time information is coincident with the synchronization time. The image pickup unit 14 performs an image pickup when receiving the synchronization information. This allows the image pickup unit 14 to generate image information and output it to the encoder 15. The encoder 15 encodes the image information to generate the encoded image information, and outputs it to the controller 13. The controller 13 obtains current time information from the timer 12, and sets the current time information as time stamp information to assign the time stamp information to the encoded image information. The controller 13 then outputs the encoded image information assigned with the time stamp information to the communication unit 11. The communication unit 11 transmits the encoded image information to the receiving device 30.

In this regard, because the synchronization time is not a time obtained by considering the communication delay amount of each CHU 10a, the time when the encoded image information arrives at the receiving device 30 may be different for each CHU 10a, thus the time when the image information arrives at the buffer 35 may be different. Accordingly, the receiving device 30 causes the communication delay amount to be identical to the system delay amount and causes the timing at which each CHU 10a generates the image information to be advanced by as much as the system delay amount. Therefore, the buffer 35 keeps the image information provided from each CHU 10 to be stored therein until the standard signal generator 40 outputs standard information of the next frame to the buffer 35.

Specifically, the communication unit 31 outputs the encoded image information provided from each CHU 10a to the determination unit 321. The determination unit 321 outputs the time stamp information contained in the encoded image information to the delay amount calculation unit 322.

The delay amount calculation unit 322 obtains current time information from the timer 327. The delay amount calculation unit 322 then subtracts a time indicated by time stamp from a current time to calculate transmission delay amount of each CHU 10a. The delay amount calculation unit 322 then outputs transmission delay amount information relating to the transmission delay amount of each CHU 10a to the statistical delay amount calculation unit 323. In addition, the delay amount calculation unit 322 calculates a jitter of each CHU 10a based on the time stamp information. The delay amount calculation unit 322 then outputs jitter information relating to the jitter of each CHU 10a to the statistical delay amount calculation unit 323.

The statistical delay amount calculation unit 323 calculates a statistical delay amount of each CHU 10a, i.e. a statistical delay amount Tb by computing the statistics of the jitter information and transmission delay amount information of each CHU 10a. In other words, the statistical delay amount calculation unit 323 sets transmission delay amount having the largest value of the transmission delay amount of each CHU 10 as statistical transmission delay amount. Further, the statistical delay amount calculation unit 323 computes the statistics of jitter information of each CHU 10a to calculate a statistical jitter.

The statistical delay amount calculation unit 323 calculates the value obtained by adding the statistical jitter to the statistical transmission delay amount, and the value is set as the statistical delay amount Tb. The statistical delay amount calculation unit 323 outputs the statistical delay amount information relating to the statistical delay amount Tb to the synchronization information generation unit 326.

The synchronization information generation unit 326 calculates a specified delay amount by adding up the decoding time of the decoder 34, the waiting time of the buffer 33, the waiting time of the buffer 35, and the longest one of encoding time of each CHU 10a. The synchronization information generation unit 326 then calculates system delay amount by adding the specified delay amount to the statistical delay amount Tb. Further, the synchronization information generation unit 326 calculates a synchronization time by subtracting the system delay amount from a reference time and by adding the period T of standard information to the result obtained from the subtraction. The synchronization information generation unit 326 outputs synchronization information relating to the synchronization time to the communication unit 31. This synchronization time is advanced than a time at which the standard signal generator 40 outputs standard information of the next frame by as much as the system delay amount. The communication unit 31 transmits the synchronization information to each CHU 10a. This allows a communication delay amount of each CHU 10a to be identical to the system delay amount. Subsequently, by the information processing system 1, the process proceeds to a fixed system delay amount mode, and the following process is performed. In addition, the information processing system 1 may regularly readjust the system delay amount.

Next, in step S10, the determination unit 321 waits until JOIN notification information is provided from the communication unit 31. Meanwhile, the controller 13 of the CHU 10, i.e. CHU 10b which wants to join in the communication network 20 outputs JOIN notification information indicating that the CHU 10b wants to join in the communication network 20 to the communication unit 11. The communication unit 11 transmits the JOIN notification information to the receiving device 30. The communication unit 31 of the receiving device 30 outputs the JOIN notification information to the determination unit 321 upon receiving the JOIN notification information.

In step S20, the determination unit 321, when receiving the JOIN notification information, outputs synchronization processing notification information to the communication unit 31. The synchronization processing notification information indicates a request to establish the synchronization with the receiving device 30. The communication unit 31 transmits the synchronization processing notification information to the CHU 10b. The communication unit 11 of the CHU 10b outputs the synchronization processing notification information to the controller 13 upon receiving the synchronization processing notification information. The controller 13 performs a synchronization establishment process for establishing the synchronization (specifically, clock synchronization) with the receiving device 30. The controller 13 outputs synchronization completion notification information relating to the process capability (e.g., transmission rate (throughput), encoding time, or the like) of the CHU 10 to the communication unit 11 after the controller 13 establishes the synchronization with the receiving device 30.

In step S30, the determination unit 321 determines whether the synchronization completion notification information is provided from the communication unit 31. In the determination unit 321, when it is determined that the synchronization completion notification information is provided from the communication unit 31, the process proceeds to step S50, while when it is determined that the synchronization completion notification information is not provided from the communication unit 31, the process proceeds to step S40.

In step S40, the determination unit 321 determines that the joining of the CHU 10b is not accepted, and then outputs JOIN rejection notification information indicating that the joining of the CHU is not accepted to the communication unit 31. The communication unit 31 then transmits the JOIN rejection notification information to the CHU 10b. Subsequently, the information processing system 1 ends the process.

In step S50, the determination unit 321 calculates a total transmission rate by adding up the transmission rate of all of the CHUs 10a and the transmission rate of the CHU 10b. Further, the determination unit 321 calculates a use rate of a network bandwidth based on the network bandwidth of the communication network 20 and the total transmission rate. The determination unit 321 sets a threshold Tr based on QoS (Quality of Service) necessary for the information processing system 1.

In step S60, the determination unit 321 determines whether the use rate of the network (i.e. total transmission rate) exceeds the threshold Tr. In the determination unit 321, when it is determined that the use rate of the network exceeds the threshold Tr, the process proceeds to step S70, while when it is determined that the use rate of the network is less than or equal to the threshold Tr, the process proceeds to step S80.

In step S70, the determination unit 321 determines that the joining of the CHU 10b is not accepted, and then outputs JOIN rejection notification information indicating that the joining of the CHU is not accepted to the communication unit 31. The communication unit 31 transmits the JOIN rejection notification information to the CHU 10b. Subsequently, the information processing system 1 ends the process.

In step S80, the communication unit 31 transmits the synchronization information to the CHUs 10a and CHU 10b. Accordingly, the CHUs 10a and CHU 10b transmit the encoded image information to the communication unit 31 upon receiving the synchronization information. In addition, in this time, a communication delay amount of the CHU 10b, i.e. an additional delay amount is not identical to the system delay amount.

The communication unit 31 outputs the encoded image information provided from the CHUs 10a and CHU 10b to the determination unit 321. The determination unit 321 outputs time stamp information contained in the encoded image information to the delay amount calculation unit 322.

The delay amount calculation unit 322 and the statistical delay amount calculation unit 323 calculate a statistical delay amount Tb' by performing a process similar to the above-mentioned preprocessing based on the time stamp information of the CHI 10a and CHU 10b. The statistical delay amount Tb' is taken the transmission delay amount of the CHU 10b into consideration. The statistical delay amount calculation unit 323 outputs statistical delay amount information relating to the statistical delay amount Tb' to the determination unit 321.

In step S90, the determination unit 321 determines whether the statistical delay amount Tb' is less than a predetermined threshold. In the determination unit 321, when it is determined that the statistical delay amount Tb' is less than the predetermined threshold, the process proceeds to step S110, while when it is determined that the statistical delay amount Tb' is greater than or equal to the predetermined threshold, the process proceeds to step S100.

In step S100, the determination unit 321 determines that the joining of the CHU 10b is not accepted, and then outputs JOIN rejection notification information indicating that the joining of the CHU 10b is not accepted to the communication unit 31. The communication unit 31 transmits the JOIN rejection notification information to the CHU 10b. Subsequently, the information processing system 1 ends the process.

In step S110, the determination unit 321 determines whether the transmission delay amount of the CHU 10b is less than the statistical delay amount Tb, i.e. the statistical delay amount of only the CHU 10a. In the determination unit 321, when it is determined that the transmission delay amount of the CHU 10b is less than the statistical delay amount Tb, the process proceeds to step S120, while when it is determined that the transmission delay amount of the CHU 10b is greater than or equal to the statistical delay amount Tb, the process proceeds to step S130.

In step S120, the synchronization information generation unit 326 actively causes the communication delay amount of the CHU 10b to be identical to the system delay amount. Specifically, the synchronization information generation unit 326 generates frame timing adjustment notification information that indicates that the communication delay amount of the CHU 10b is to be identical to the system delay amount, and then outputs the frame timing adjustment notification information to the communication unit 31.

The communication unit 31 transmits the frame timing adjustment notification information to the CHU 10b. The communication unit 11 of the CHU 10b outputs the frame timing adjustment notification information to the controller 13. The controller 13 adjusts each component (e.g., PLL, buffer) of the CHU 10b so that the timing of generating image information may be advanced by the system delay amount. The controller 13 then outputs frame timing adjustment completion notification information to the communication unit 11, and the communication unit 11 transmits the frame timing adjustment completion notification information to the receiving device 30.

Subsequently, the synchronization information generation unit 326 subtracts the system delay amount from a reference time and adds the period T of standard information to the result obtained from the subtraction to calculate a synchronization time. The synchronization information generation unit 326 outputs synchronization information relating to the synchronization time to the communication unit 31. The communication unit 31 transmits the synchronization information to each of the CHUs 10a and CHU 10b. This allows a communication delay amount of each of the CHUs 10a and CHU 10b to be identical to the system delay amount. Subsequently, the information processing system 1 ends the process.

On the other hand, in step S130, the synchronization information generation unit 326 calculates an adjustment delay amount of the CHU 10b based on the following Equation (1).

$$Tl'=Tl-n\times T \quad (1)$$

In Equation (1), Tl' is an adjustment delay amount of the CHU 10b, Tl is a communication delay amount of the CHU 10b, and n is a positive integer and is set to satisfy the following Equation (2). T is a period T of standard information. In addition, the reason why the adjustment delay amount is set as the Equation (1) is that it is difficult for the CHU 10b to advance the timing for generating the image information by one period or more.

$$0<(Tl-n\times T)<T \quad (2)$$

Subsequently, the synchronization information generation unit 326 generates frame timing adjustment notification information that indicates that the communication delay amount of the CHU 10b is adjusted to the adjustment delay amount, and then outputs the frame timing adjustment notification information to the communication unit 31. The communication unit 31 transmits the frame timing adjustment notification information to the CHU 10b. The communication unit 11 of the CHU 10b outputs the frame timing adjustment notification information to the controller 13. The controller 13 adjusts each component (e.g., PLL, buffer) of the CHU 10b so that the timing of generating image information may be advanced by the adjustment delay amount. The controller 13 then outputs frame timing adjustment completion notification information to the communication unit 11. The communication unit 11 transmits the frame timing adjustment completion notification information to the receiving device 30.

Next, the synchronization information generation unit 326 subtracts the adjustment delay amount from a reference time and adds the period T of standard information to the result obtained from the subtraction to calculate a synchronization time. The synchronization information generation unit 326 outputs synchronization information relating to the synchronization time to the communication unit 31. The communication unit 31 transmits the synchronization information to the CHU 10b. This allows a communication delay amount of the CHU 10b to be adjusted to the adjustment delay amount. In addition, in this case, the image information of the CHU 10b will arrive later than the image information of the CHU 10a by n frames at the buffer 35 of the receiving device 30.

In step S140, the synchronization information generation unit 326 generates delay notification information that indicates that the image information of the CHU 10b is delayed with respect to the image information of the CHU 10a by n frames, and outputs the delay notification information to the communication unit 31. The communication unit 31 transmits the delay notification information to each CHU 10a or a relay. Subsequently, the information processing system 1 ends the process.

Thus, the receiving device 30 determines whether the joining of the CHU 10b in the communication network 20 is accepted based on the influence of the CHU 10b on the communication network 20 connected to the CHU 10a. Therefore, the receiving device 30 can appropriately determine whether the joining of the CHU 10b in the communication network 20 is accepted, and accordingly, information processing can be appropriately performed even when the number of CHU 10 constituting an information processing system 1 is increased.

Further, the receiving device 30 determines whether the joining of the CHU 10b in the communication network 20 is accepted, based on the state of communication performed by the CHU 10b via the communication network 20. Thus, the receiving device 30 can appropriately determine whether the joining of the CHU 10b in the communication network 20 is accepted.

Moreover, the receiving device 30 determines whether the joining of the CHU 10b in the communication network 20 is accepted, based on at least one of a transmission rate, a delay amount, a jitter, a packet loss rate, congestion, a reordering frequency, or a packet duplication frequency of the communication performed by the CHU 10b via the communication network 20. Thus, the receiving device 30 can appropriately determine whether the joining of the CHU 10b in the communication network 20 is accepted.

Furthermore, the receiving device 30 determines whether the joining of the CHU 10b in the communication network 20 is accepted, based on a network bandwidth of the communication network 20 and a total value of a transmission rate of the CHUs 10a and CHU 10b. Thus, the receiving device 30 can appropriately determine whether the joining of the CHU 10b in the communication network 20 is accepted.

In addition, when it is determined that the CHU 10b is accepted to join in the communication network 20, the receiving device 30 adjusts the communication delay amount of the CHU 10b based on the communication delay amount of the CHU 10a, more specifically the system delay amount. Thus, the receiving device 30 can adjust the communication delay amount of the CHU 10b to an appropriate value.

[1-6. Modification]

Figure 5:
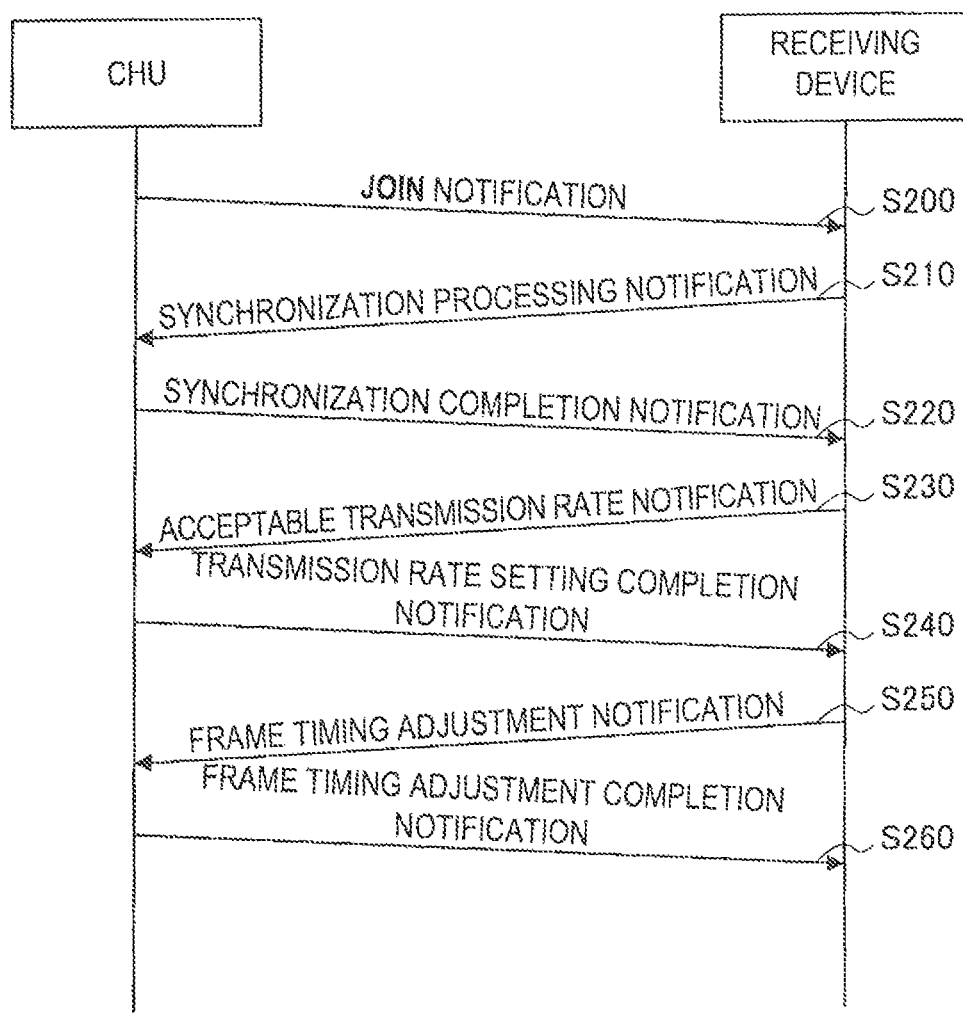
FIG. 5 is a sequence diagram illustrating an exemplary process performed between the CHU and the receiving device.

Next, a modification of the first embodiment will be described with reference to the timing chart shown in FIG. 5. In this modification, when the joining of the CHU 10b in the communication network 20 is not accepted, the receiving device 30 notifies the CHU 10b of a condition necessary for the CHU 10b to join in the communication network 20.

In steps S200 to S220, the information processing system 1 performs a similar process to that performed in the above-mentioned steps S10 to S50. In step S230, the determination unit 321 determines whether the use rate of the network a total transmission rate) exceeds the threshold Tr. When it is determined that the use rate of the network exceeds the threshold Tr, the determination unit 321 performs the following process. When it is determined that the use rate of the network is less than or equal to the threshold Tr, the determination unit 321 performs the previous steps from the above-mentioned step S80.

In other words, the determination unit 321 calculates a transmission rate of the CHU 10b which is necessary for the use rate of the network to be less than or equal to the threshold Tr, i.e. an acceptable transmission rate. The determination unit 321 then generates acceptable transmission rate notification information relating to the acceptable transmission rate, and outputs the acceptable transmission rate notification information to the communication unit 31. The communication unit 31 transmits the acceptable transmission rate notification information to the CHU 10b. The communication unit 11 of the CHU 10b receives the acceptable transmission rate notification information, and outputs the acceptable transmission rate notification information to the controller 13. The controller 13 adjusts the transmission rate of the CHU 10b to the acceptable transmission rate. The controller 13 then outputs transmission rate setting completion notification information to the communication unit 11. The communication unit 11 transmits the transmission rate setting completion notification information to the receiving device 30. The communication unit 31 of the receiving device 30 receives the transmission rate setting completion notification information, and outputs the transmission rate setting completion notification information to the determination unit 321. In addition, the determination unit 321 may notify the CHU 10b of an acceptable communication path, and the acceptable communication path is a communication path with the CHU 10b which is necessary for the use rate of the network to be less than or equal to the threshold Tr.

Subsequently, in step S250 to S260, the information processing system 1 performs the same process as that of the above-mentioned steps S80 to S140. In this modification, when the joining of the CHU 10b in the communication network 20 is not accepted, the receiving device 30 notifies the CHU 10b of a condition that is necessary for the CHU 10b to join in the communication network 20, more specifically the acceptable transmission rate. Thus, the receiving device 30 can enable the CHU 10b to join more certainly in the communication network 20.

2. Second Embodiment

Figure 6:
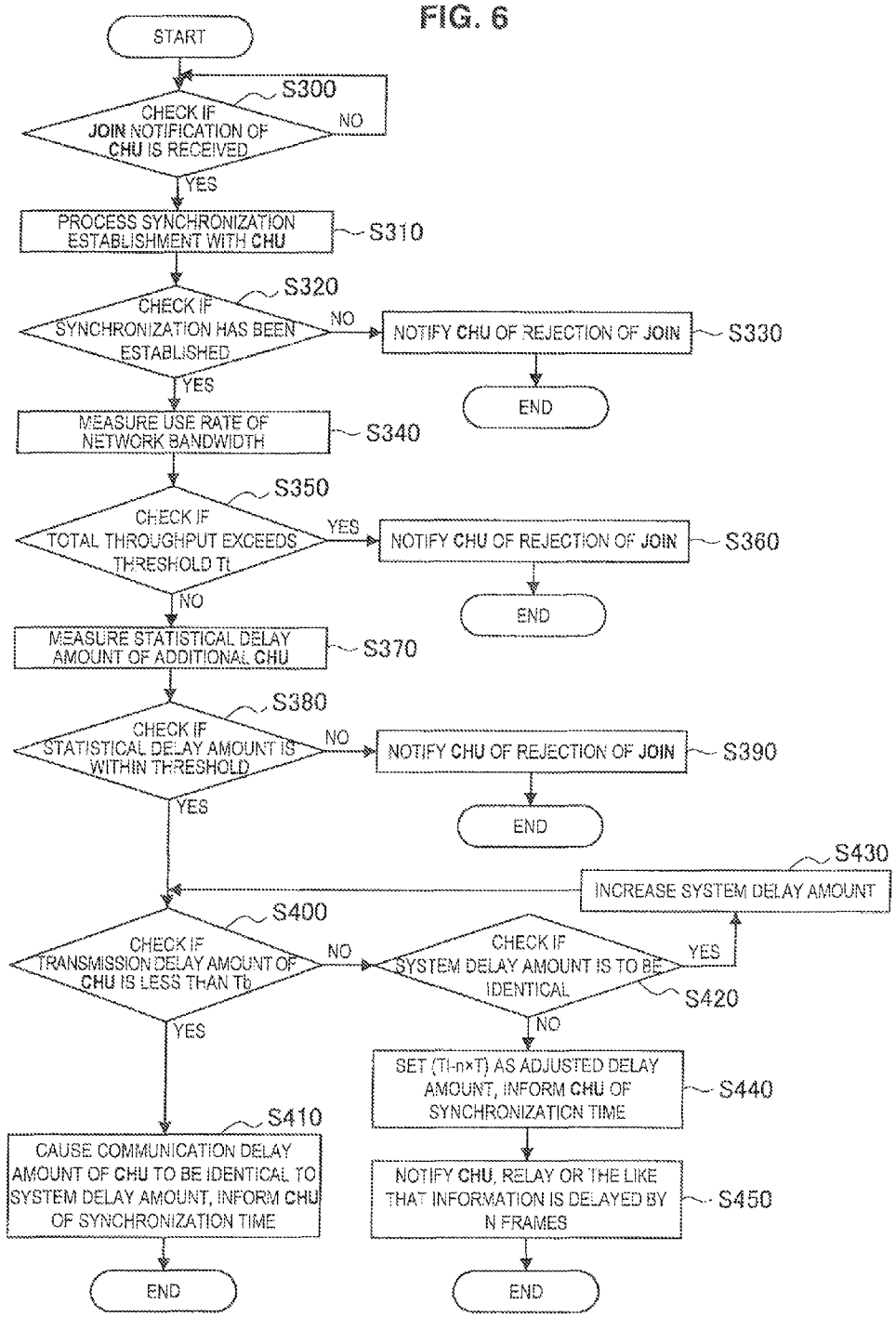
FIG. 6 is a flowchart illustrating a procedure of a process performed by a receiving device according to a second embodiment of the present disclosure.

Next, a second embodiment of the present disclosure will be described. The second embodiment is different from the first embodiment in that the communication delay amount of the CHU 10b is more actively identical to the system delay amount. The process according to the second embodiment will be described with reference to the flowchart shown in FIG. 6.

In steps S300 to S390, the information processing system 1 performs a process similar to that performed in the steps S10 to S100 of the first embodiment. In step S400, the determination unit 321 determines whether the transmission delay amount of the CHU 10b is less than the statistical delay amount Tb, i.e. the statistical delay amount of only the CHU 10a. In the determination unit 321, when it is determined that the transmission delay amount of the CHU 10b is less than the statistical delay amount Tb, the process proceeds to step S410, while when it is determined that the transmission delay amount of the CHU 10b is greater than or equal to the statistical delay amount Tb, the process proceeds to step S420.

In step S410, the synchronization information generation unit 326 performs a process similar to that performed in the step S120 of the first embodiment. Subsequently, the information processing system 1 ends the process.

Meanwhile, in step S420, the determination unit 321 determines whether the system delay amount and a communication delay amount of the CHU 10b, i.e. an additional delay amount are identical to each other, based on the state of communication performed by the CHU 10b via the communication network 20. As a result, in the determination unit 321, when it is determined that the system delay amount and the additional delay amount are to be identical to each other, the process proceeds to step S430, while when it is determined that the system delay amount and the additional delay amount are not identical to each other, the process proceeds to step S440.

In this regard, the determination unit 321 determines whether the system delay amount and the additional delay amount are identical to each other, based on at least one of a jitter, a packet loss rate, congestion, a reordering frequency, or a packet duplication frequency of the CHU 10b.

Specifically, the determination unit 321 receives several frames of the encoded image information from the CHU 10b, and detects a jitter occurred in these encoded image information. When the detected jitter is less than a predetermined threshold, the determination unit 321 determines that the system delay amount and the additional delay amount are to be identical to each other.

In addition, the determination unit 321 receives several frames the encoded image information from the CHU 10b, and calculates the packet loss rate of the encoded image information based on these encoded image information. When the packet loss rate is less than a predetermined threshold, the determination unit 321 determines that the system delay amount and the additional delay amount are to be identical to each other.

Further, the determination unit 321 monitors relays of the communication network 20 and thus detects the congestion occurred with respect to the encoded image information provided from the CHU 10b. When the extent of congestion, more specifically the total number of packets discarded from each relay within a predetermined period of time is less than a predetermined threshold, the determination unit 321 determines that the system delay amount and the additional delay amount are to be identical to each other.

Moreover, the determination 321 receives several frames of the encoded image information from the CHU 10b, and detects the packet reordering (change in the packet order) occurred in these encoded image information. When the number of packet reordering times (frequency) is less than a predetermined threshold, the determination unit 321 determines that the system delay amount and the additional delay amount are to be identical to each other.

Furthermore, the determination 321 receives several frames of the encoded image information from the CHU 10b, and counts the number of times the packets that are duplicated in these encoded image information. When the counted number of times (frequency) is less than a predetermined threshold, the determination unit 321 then determines that the system delay amount and the additional delay amount are to be identical to each other. In addition, the determination unit 321 can make the determination by any combination of the factors listed above.

In step S430, the communication controller 32 causes the system delay amount and the additional delay amount to be identical to each other by increasing (delaying) the system delay amount. Specifically, the synchronization information generation unit 326 calculates the specified delay amount by adding up the longest one of encoding time of the CHUs 10a and the CHU 10b, the decoding time of the decoder 34, the waiting time of the buffer 33, and the waiting time of the buffer 35.

Next, the synchronization information generation unit 326 calculates the system delay amount by adding the specified delay amount to a statistical delay amount Tb' of the CHUs 10a and CHU 10b which is calculated in step S370. The synchronization information generation unit 326 then returns to step S400. Then, the information processing system 1 proceeds from steps S400 to step S410, and causes the communication delay amount of the CHU 10b to be identical to the system delay amount. The information processing system 1, in steps S440 to S450, performs a process similar to that of the steps S130 to S140 of the first embodiment.

As described above, according to the second embodiment, when the CHU 10b has joined in the communication network 20, the receiving device 30 causes the system delay amount with the additional delay amount that indicates the delay amount of communication performed by the CHU 10b via the communication network 20. Thus, the receiving device 30 can cause the timing when the image information provided from the CHU 10a arrives at the buffer 35 of the receiving device 30 and the timing when the image information provided from the CHU 10b arrives at the buffer 35 of the receiving device 30 to be identical to each other. In other words, even if the number of the CHU 10 constituting the information processing system 1 is increased, the receiving device 30 can appropriately perform information processing.

Further, the receiving device 30 automatically determines whether the system delay amount and the additional delay amount are to be identical to each other, and thus a user can easily obtain image information having the communication delay amount whose variation is reduced.

Moreover, the receiving device 30 automatically determines whether the system delay amount and the additional delay amount are to be identical to each other based on the state of communication performed b the CHU 10b via the communication network 20. Thus, the determination whether the system delay amount and the additional delay amount are to be identical to each other can be appropriately performed.

Furthermore, the receiving device 30 automatically determines whether the system delay amount and the additional delay amount are to be identical to each other, based on at least one of a jitter, a packet loss rate, congestion, a reordering frequency, or a packet duplication frequency of the communication performed by the CHU 10b via the communication network 20. Therefore, the receiving device 30 can appropriately determine whether the system delay amount and the additional delay amount are to be identical to each other.

In addition, when the additional delay amount is greater than the system delay amount, the receiving device 30 causes the system delay amount to be identical to the additional delay amount by increasing the system delay amount. Accordingly, the receiving device 30 can adjust the system delay amount to an appropriate value.

3. Third Embodiment

Figure 7:
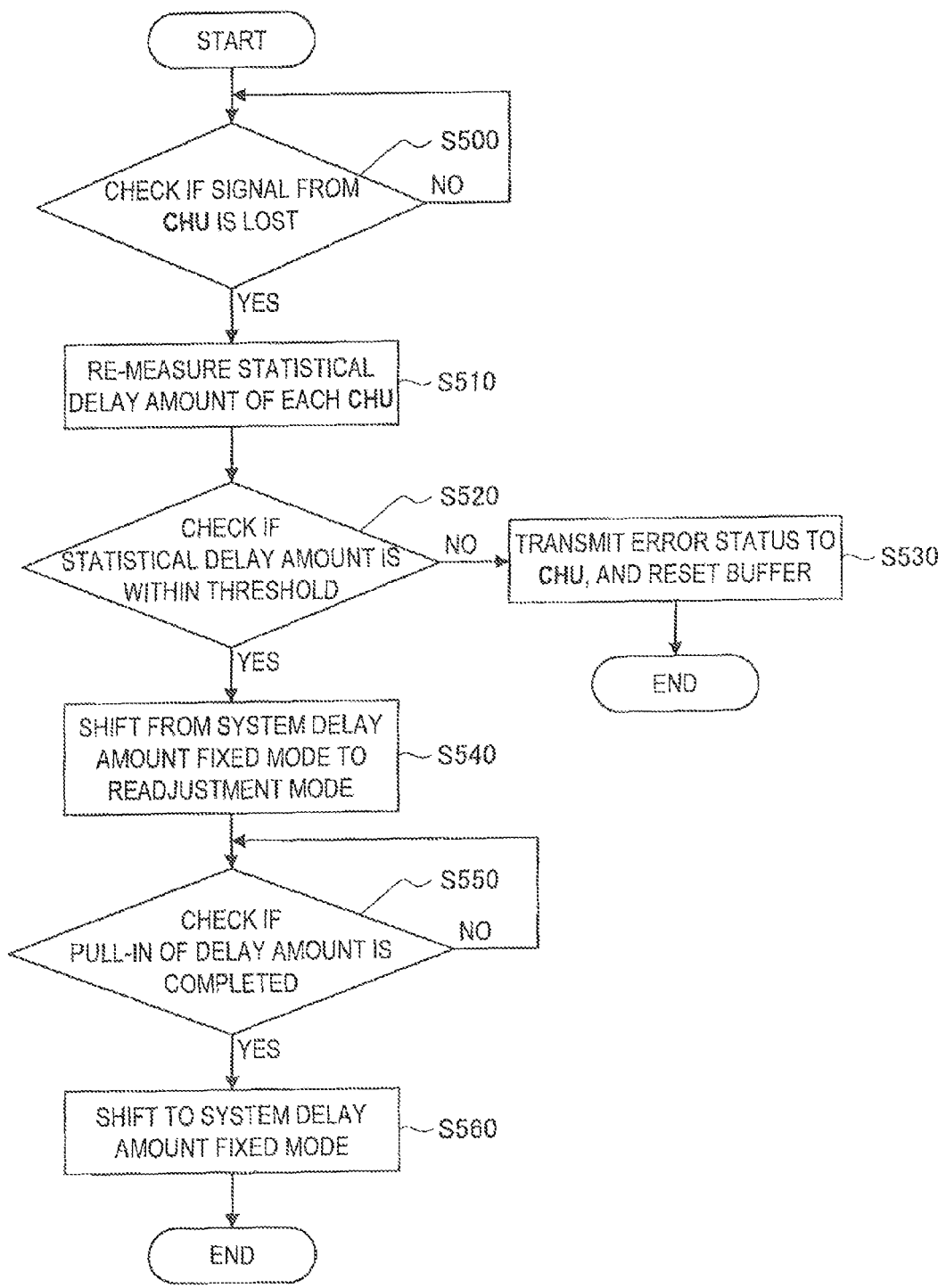
FIG. 7 is a flowchart illustrating a procedure of a process performed by a receiving device according to a third embodiment of the present disclosure.

Next, a third embodiment of the present disclosure will be described. The third embodiment is different from the first and second embodiments in that the system delay amount will be readjusted when any one of the CHUs 10a is disconnected from communication network. The process according to the third embodiment will be described with reference to the flowchart shown in FIG. 7.

In step S500, the determination unit 321 determines whether the encoded image information is no longer provided from any CHU 10a. In step S510, the delay amount calculation unit 322 and the statistical delay amount calculation unit 323 recalculate (measure) the statistical delay amount Tb of the CHU 10a which has joined in the communication network 20. The specific calculation method is similar to that of the step S80 of the first embodiment.

In step S520, the determination unit 321 determines whether the statistical delay amount Tb is less than a predetermined threshold. In the determination unit 321, when it is determined that the statistical delay amount Tb is less than the predetermined threshold, the process proceeds to step S540, while when it is determined that the statistical delay amount Tb is greater than or equal to the predetermined threshold, the process proceeds to step S530.

In step S530, the determination unit 321 generates error status notification information that indicates an error occurred in the communication network 20, and then outputs the error status notification information to the communication unit 31. The communication unit 31 transmits the error status notification information to each CHU 10a. The determination unit 321 then resets the buffer 33 configured to absorb a jitter, or resets the communication with the CHU 10a. Subsequently, the receiving device 30 ends the process.

Meanwhile, in step S540, the synchronization information generation unit 326 moves the process from a fixed system delay amount mode to a readjusted system delay amount mode, and performs a process that cause the communication delay amount of each CHU 10a to be gradually close to the system delay amount.

Specifically, the synchronization information generation unit 326 subtracts an adjusted delay amount less than the system delay amount from a reference time and adds the period T of standard information to the result obtained from the subtraction to calculate a synchronization time. The synchronization information generation unit 326 outputs synchronization information relating to the synchronization time to the communication unit 31. Whenever reference tune information is provided from the standard information conversion unit 324, the synchronization information generation unit 326 increases the adjusted delay amount and performs a process similar to that described above. Thus, the communication delay amount of the CHU 10a is gradually close to the system delay amount. In addition, this process may be performed for the CHU 10b in the steps S120, S130, S410, and S440 of the above-mentioned first and second embodiments.

In step S550, the synchronization information generation unit 326 waits until the adjusted delay amount is coincident with the system delay amount, that is to say, until the process for causing, the communication delay amount to be pulled into the system delay amount is completed. In step S560, the communication controller 32 moves to the fixed system delay amount mode. Subsequently, the receiving device 30 ends the process.

As described above, according to the third embodiment, when any one of the CHUs 10a is disconnected from the communication network 20, the receiving device 30 readjusts the system delay amount, and thus the system delay amount is maintained at an appropriate value. For example, when a CHU 10a having the shortest communication delay amount is disconnected from the communication network 20, the receiving device 30 can reduce the statistical delay amount Tb, and thus the system delay amount can become smaller. In other words, the receiving device 30 accepts the timing when image information of each CHU 10a arrives at the buffer 35 to be advanced. Thus, the receiving device 30 can perform an appropriate process even when the number of the CHUs 10a constituting the information processing system 1 is decreased.

Further, in case where the adjusted system delay amount, more specifically the statistical delay amount is greater than a predetermined threshold, the receiving device 30 resets the buffer 33 configured to absorb a jitter or the communication with the CHU 10a. Thus, when an abnormality arises in the communication network 20, the receiving device 30 can rapidly reset the communication.

4. Another Exemplary Configuration of Information Processing System

Figure 8:
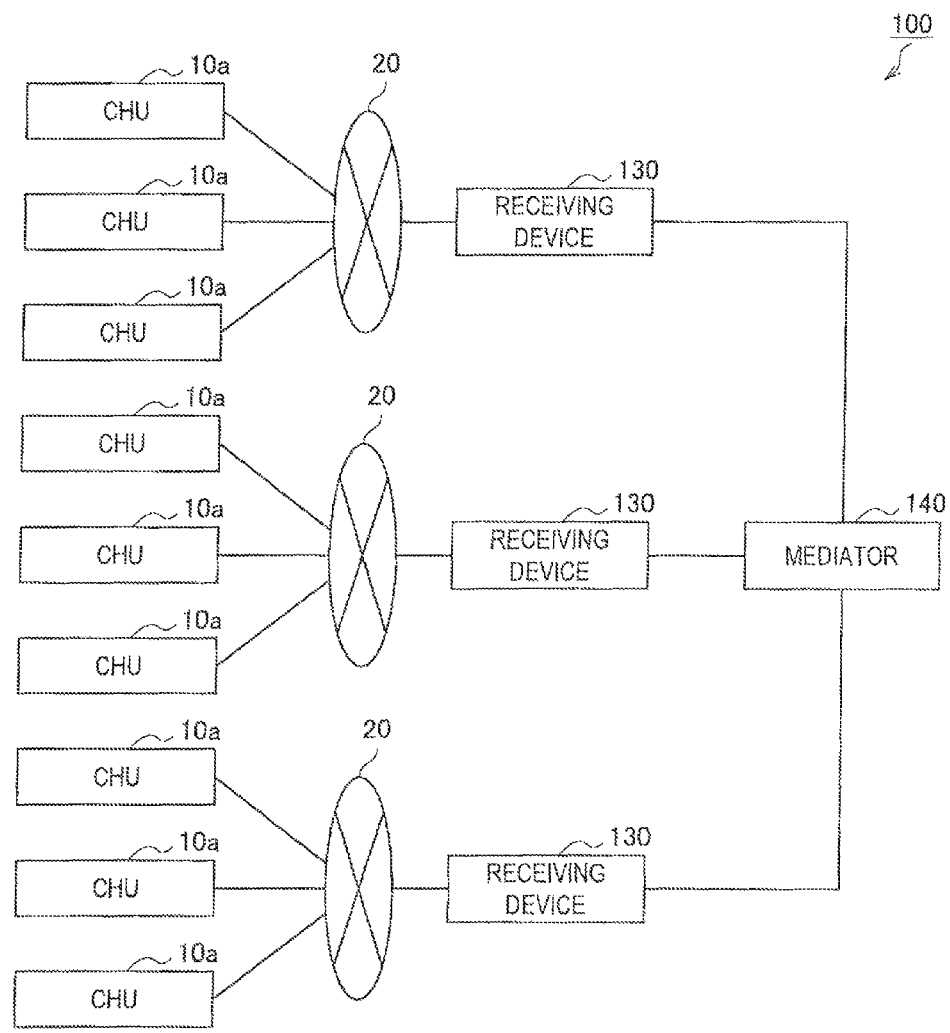
FIG. 8 is a block diagram illustrating another example of the information processing system.

Next, another exemplary configuration of the information processing system 1 will be described. An information processing system 100 shown in FIG. 8 includes a plurality of receiving devices 130, a mediator 140 connected to each receiving device 130 and a plurality of CHUs 10a connected to each receiving device 130 via a communication network 20. In this case, the mediator 140 has a function similar to that of the above-mentioned communication controller 32. The mediator 140 causes the communication delay amount of each CHU 10a to be identical to the system delay amount. In addition, the mediator 140 performs processes similar to those of the above-mentioned first to third embodiments.

Figure 9:
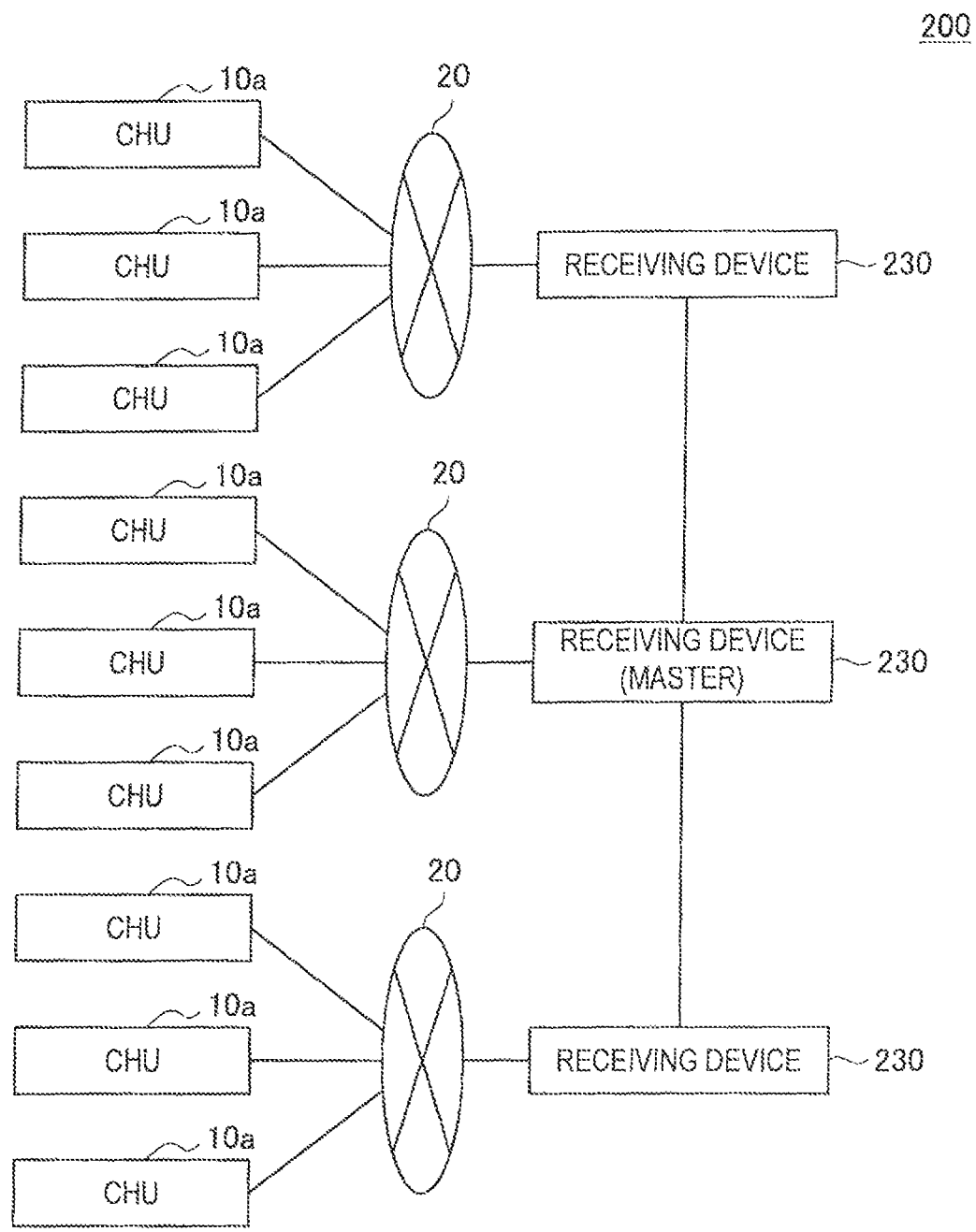
FIG. 9 is a block diagram illustrating yet another example of the information processing system.

An information processing system 200 shown in FIG. 9 includes a plurality of receiving devices 230 and a plurality of CHUs 10a connected to each receiving device 230 via a communication network 20. In this information processing system 200, any one of the receiving devices 230 becomes a master device including a communication controller 92. The master receiving device 230 causes the communication delay amount of each CHU 10a to be identical to the system delay amount. In addition, the master receiving device 230 performs processes similar to those of the above-mentioned first to third embodiments.

Figure 10:
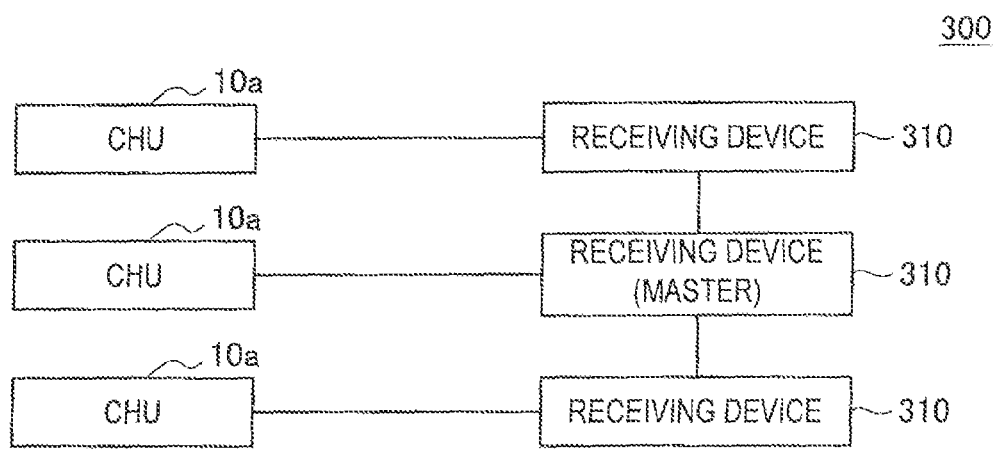
FIG. 10 is a block diagram illustrating still another example of the information processing system.

An information processing system 300 shown in FIG. 10 includes a plurality of receiving devices 310 and a plurality of CHUs 10a connected to each receiving device 310 via a communication network 20. In this example, each of the receiving devices 310 is connected to the respective CHUs 10a. In this information processing system 300, any one of the receiving devices 310 becomes a master device including a communication controller 92. The master receiving device 310 causes the communication delay amount of each CHU 10a to be identical to the system delay amount. In addition, the master receiving device 310 performs processes similar to those of the above-mentioned first to third embodiments. Note that a mediator such as that shown in FIG. 8 may be connected to each receiving device 310 instead of using any one of the receiving devices 310 as a master device.

It should be understood by those skilled in the art that various modifications, combinations, sub-combinations and alterations may occur depending on design requirements and other factors insofar as they are within the scope of the appended claims or the equivalents thereof.

For example, in the above embodiments, the communication delay amount of each CHU 10a is to be identical to the system delay amount by causing the timing when each CHU 10a generates image information to be advanced by the system delay amount. The present disclosure is not limited to these embodiments. For example, it may be possible for the communication delay amount of each CHU 10a to be absorbed by the buffer 35.

In this case, the synchronization information generation unit 326 sets the synchronization time of each CHU 10a so that image information provided from each CHU 10a may reach the buffer 35 at the timing delayed by as much as the system delay amount with respect to the standard information. In addition, in step S120, the synchronization information generation unit 326 adjusts the synchronization time of the CHU 10b so that image information provided from each CHU 10b may reach the buffer 35 at the same timing as each CHU 10a. In addition, in step S440, the synchronization information generation unit 326 adjusts the synchronization time of the CHU 10b so that image information provided from each CHU 10b may reach the buffer 35 at the timing delayed by as much as n' frames with respect to the image information of each CHU 10a. Here, n' is an integer that satisfies the following Equation (3).

$$(Ta+n'\times T)>Tl \quad (3)$$

In this Equation (3), Ta is the system delay amount, T is a period of standard information, and Tl is the communication delay amount of the CHU 10b.

Additionally, the present technology may also be configured as below.

(1) An information processing apparatus including:
a communication controller for determining, based on an influence of a second communication device on a communication network connected to one or more first communication devices, whether joining of the second communication device in the communication network is accepted.

(2) The information processing apparatus according to (1), wherein the communication controller determines whether the joining of the second communication device in the communication network is accepted, based on a state of communication performed by the second communication device via the communication network.

(3) The information processing apparatus according to (2), wherein the communication controller determines whether the joining of the second communication device in the communication network is accepted, based on at least one of a transmission rate, a delay amount, a jitter, a packet loss rate, congestion, a reordering frequency, or a packet duplication frequency of communication performed by the second communication device via the communication network.

(4) The information processing apparatus according to (3), wherein the communication controller determines whether the joining of the second communication device in the communication network is accepted, based on a network bandwidth of the communication network and a total value of transmission rates of the one or more first communication devices and the second communication device.

(5) The information processing apparatus according to any one of (1) to (4), wherein, when the joining of the second communication device in the communication network is accepted, the communication controller adjusts a delay amount of communication performed by the second communication device via the communication network based on a delay amount of communication performed by the one or more first communication devices via the communication network.

(6) The information processing apparatus according to any one of (1) to (5), wherein, when the joining of the second communication device in the communication network is not accepted, the communication controller notifies the second communication device of a condition necessary for the second communication device to join in the communication network.

(7) An information processing apparatus including:
a communication controller for causing a delay amount of communication performed by one or more first communication devices via a communication network to be identical to a system delay amount, and when a second communication device joins in the communication network, causing the system delay amount to be identical to an additional delay amount, the additional delay amount being a delay amount of communication performed by the second communication device via the communication network.

(8) The information processing apparatus according to (7), wherein the communication controller automatically determines whether the system delay amount is to be identical to the additional delay amount.

(9) The information processing apparatus according to (8), wherein the communication controller automatically determines whether the system delay amount is to be identical to the additional delay amount, based on a state of communication performed by the second communication device via the communication network.

(10) The information processing apparatus according to (9), wherein the communication controller automatically determines whether the system delay amount is to be identical to the additional delay amount, based on at least one of a jitter, a packet loss rate, congestion, a reordering frequency, or a packet duplication frequency of communication performed by the second communication device via the communication network.

(11) The information processing apparatus according to any one of (7) to (10), wherein, when the additional delay amount is greater than the system delay amount, the communication controller causes the system delay amount to be identical to the additional delay amount by increasing the system delay amount.

(12) An information processing apparatus including:
a communication controller for causing a delay amount of communication performed by a plurality of first communication devices via a communication network to be identical to a system delay amount, and when one of the plurality of first devices is disconnected from the communication network, readjusting the system delay amount.

(13) The information processing apparatus according to (12), wherein, when the readjusted system delay amount is greater than a predetermined threshold, the communication controller resets a buffer configured to absorb a jitter or resets communication with the plurality of first communication devices.

(14) An information processing method including:
determining, based on an influence of a second communication device on a communication network connected to one or more first communication devices, whether joining of the second communication device in the communication network is accepted.

(15) An information processing method including:
causing a delay amount of communication performed by one or more first communication devices via a communication network to be identical to a system delay amount, and when a second communication device joins in the communication network, causing the system delay amount to be identical to an additional delay amount, the additional delay amount being a delay amount of communication performed by the second communication device via the communication network.

(16) An information processing method including:
causing a delay amount of communication performed by first communication devices via a communication network to be identical to a system delay amount, and when a given first communication device of the first communication devices is disconnected from the communication network, adjusting the system delay amount.

(17) An information processing system including:
one or more first communication devices; and
an information processing apparatus including a communication controller for determining, based on an influence of a second communication device on a communication network connected to the one or more first communication devices, whether joining of the second communication device in the communication network is accepted.

(18) An information processing system including:
one or more first communication devices; and
an information processing apparatus including a communication controller for causing a delay amount of communication performed by the one or more first communication devices via a communication network to be identical to a system delay amount, and when a second communication device joins in the communication network, causing the system delay amount to be identical to an additional delay amount, the additional delay amount being a delay amount of communication performed by the second communication device via the communication network.

(19) An information processing system including:
a plurality of first communication devices; and
an information processing, apparatus including a communication controller for causing a delay amount of communication performed by the plurality of first communication devices via a communication network to be identical to a system delay amount, and when any of the plurality of first communication devices are disconnected from the communication network, readjusting the system delay amount.

The present disclosure contains subject matter related to that disclosed in Japanese Priority Patent Application JP 2012-009034 filed in the Japan Patent Office on Jan. 19, 2012, the entire content of which is hereby incorporated by reference.

What is claimed is:

1. An information processing apparatus comprising:
a communication controller configured to:
determine, based on an influence of a second communication device on a communication network connected to one or more first communication devices, whether joining of the second communication device in the communication network is accepted; and
when the joining of the second communication device in the communication network is not accepted, notify the second communication device of a condition to be satisfied for the second communication device to join the communication network.

2. The information processing apparatus according to claim 1, wherein the communication controller is configured to determine whether the joining of the second communication device in the communication network is accepted, based on a state of communication performed by the second communication device via the communication network.

3. The information processing apparatus according to claim 2, wherein the communication controller is configured to determine whether the joining of the second communication device in the communication network is accepted, based on at least one of a transmission rate, a delay amount, a jitter, a packet loss rate, congestion, a reordering frequency, or a packet duplication frequency of communication performed by the second communication device via the communication network.

4. The information processing apparatus according to claim 3, wherein the communication controller is configured to determine whether the joining of the second communication device in the communication network is accepted, based on a network bandwidth of the communication network and a total value of transmission rates of the one or more first communication devices and the second communication device.

5. The information processing apparatus according to claim 1, wherein, when the joining of the second communication device in the communication network is accepted, the communication controller is configured to adjust a delay amount of communication performed by the second communication device via the communication network based on a delay amount of communication performed by the one or more first communication devices via the communication network.

6. An information processing system comprising:
a plurality of first communication devices; and
an information processing apparatus including a communication controller configured to:
cause a delay amount of communication performed by the plurality of first communication devices via a communication network to be identical to a system delay amount; and
when one of the plurality of first communication devices are disconnected from the communication network, adjust the system delay amount.

7. An information processing apparatus comprising:
a communication controller configured to:
  cause a delay amount of communication performed by one or more first communication devices via a communication network to be identical to a system delay amount; and
  when a second communication device joins the communication network, increase the system delay amount to cause the system delay amount to be identical to an additional delay amount, the additional delay amount being a delay amount of communication performed by the second communication device via the communication network and the additional delay amount being greater than the system delay amount.

8. The information processing apparatus according to claim 7, wherein the communication controller is configured to automatically determine whether the system delay amount is to be identical to the additional delay amount.

9. The information processing apparatus according to claim 8, wherein the communication controller is configured to automatically determine whether the system delay amount is to be identical to the additional delay amount, based on a state of communication performed by the second communication device via the communication network.

10. The information processing apparatus according to claim 9, wherein the communication controller is configured to automatically determine whether the system delay amount is to be identical to the additional delay amount, based on at least one of a jitter, a packet loss rate, congestion, a reordering frequency, or a packet duplication frequency of communication performed by the second communication device via the communication network.

11. An information processing system comprising:
one or more first communication devices; and
an information processing apparatus including a communication controller configured to:
  cause a delay amount of communication performed by the one or more first communication devices via a communication network to be identical to a system delay amount; and
  when a second communication device joins the communication network, increase the system delay amount to cause the system delay amount to be identical to an additional delay amount, the additional delay amount being a delay amount of communication performed by the second communication device via the communication network and the additional delay amount being greater than the system delay amount.

12. An information processing apparatus comprising:
a communication controller configured to:
  cause a delay amount of communication performed by a plurality of first communication devices via a communication network to be identical to a system delay amount; and
  when one of the plurality of first communication devices is disconnected from the communication network, readjust the system delay amount.

13. The information processing apparatus according to claim 12, wherein, when the readjusted system delay amount is greater than a predetermined threshold, the communication controller is configured to reset a buffer configured to absorb a jitter or reset communication with the plurality of first communication devices.

14. An information processing method comprising:
determining, based on an influence of a second communication device on a communication network connected to one or more first communication devices, whether joining of the second communication device in the communication network is accepted; and
when the joining of the second communication device in the communication network is not accepted, notifying the second communication device of a condition to be satisfied for the second communication device to join the communication network.

15. An information processing method comprising:
causing a delay amount of communication performed by one or more first communication devices via a communication network to be identical to a system delay amount; and
when a second communication device joins the communication network, increasing the system delay amount to cause the system delay amount to be identical to an additional delay amount, the additional delay amount being a delay amount of communication performed by the second communication device via the communication network and the additional delay amount being greater than the system delay amount.

16. An information processing method comprising:
causing a delay amount of communication performed by a plurality of first communication devices via a communication network to be identical to a system delay amount, and
when a first communication device of the plurality of first communication devices is disconnected from the communication network, adjusting the system delay amount.

17. An information processing system comprising:
one or more first communication devices; and
an information processing apparatus including a communication controller configured to:
  determine, based on an influence of a second communication device on a communication network connected to the one or more first communication devices, whether joining of the second communication device in the communication network is accepted; and
  when the joining of the second communication device in the communication network is not accepted, notify the second communication device of a condition to be satisfied for the second communication device to join the communication network.

* * * * *